(12) United States Patent
Tanner et al.

(10) Patent No.: US 10,586,224 B2
(45) Date of Patent: *Mar. 10, 2020

(54) METHODS AND SYSTEMS FOR PREPAID MOBILE PAYMENT STAGING ACCOUNTS

(71) Applicant: MasterCard International Incorporated, Purchase, NY (US)

(72) Inventors: Colin Tanner, Middlesex (GB); Christina E. Sheppard, Mamaroneck, NY (US); John Mwangi, White Plains, NY (US)

(73) Assignee: Mastercard International Incorporated, Purchase, NY (US)

( * ) Notice: Subject to any disclaimer, the term of this patent is extended or adjusted under 35 U.S.C. 154(b) by 571 days.

This patent is subject to a terminal disclaimer.

(21) Appl. No.: 15/365,024

(22) Filed: Nov. 30, 2016

(65) Prior Publication Data

US 2017/0083895 A1    Mar. 23, 2017

Related U.S. Application Data

(63) Continuation of application No. 14/050,448, filed on Oct. 10, 2013, now Pat. No. 9,542,673.

(60) Provisional application No. 61/711,922, filed on Oct. 10, 2012.

(51) Int. Cl.
| | | |
|---|---|---|
| G06Q 40/00 | (2012.01) | |
| G06Q 20/28 | (2012.01) | |
| G06Q 20/10 | (2012.01) | |
| G06Q 20/32 | (2012.01) | |
| G06Q 20/36 | (2012.01) | |

(52) U.S. Cl.
CPC ............ *G06Q 20/28* (2013.01); *G06Q 20/10* (2013.01); *G06Q 20/322* (2013.01); *G06Q 20/36* (2013.01)

(58) Field of Classification Search
None
See application file for complete search history.

(56) References Cited

U.S. PATENT DOCUMENTS

| | | | | |
|---|---|---|---|---|
| 2004/0122768 A1* | 6/2004 | Creamer | ............ | G06Q 20/105 705/41 |
| 2006/0000900 A1* | 1/2006 | Fernandes | ............ | G06Q 20/04 235/380 |
| 2009/0030844 A1* | 1/2009 | Hoffman | ............ | G06Q 20/04 705/67 |
| 2009/0164322 A1* | 6/2009 | Khan | ............ | G06Q 20/105 705/14.14 |

(Continued)

*Primary Examiner* — Scott S Trotter
(74) *Attorney, Agent, or Firm* — Buckley, Maschoff & Talwalkar LLC

(57) ABSTRACT

Systems and methods for provisioning a prepaid mobile staging account to consumer mobile devices are described that allow issuer financial institutions to quickly and efficiently launch NFC device payment programs. In an embodiment, a staging account provider computer receives a request to provision a prepaid mobile payment staging account that includes identification information and associates the identification information with a prepaid mobile staging account. The staging account provider computer then identifies a financial account of the consumer held by an issuer financial institution (FI), generates a consumer prepaid mobile staging account loaded with funds from the financial account of the consumer, and transmits a confirmation message to the consumer's mobile device indicating successful setup.

15 Claims, 7 Drawing Sheets

(56) References Cited

U.S. PATENT DOCUMENTS

2012/0203700 A1\* 8/2012 Ornce ................ G06Q 20/3278
705/67

\* cited by examiner

METHODS AND SYSTEMS FOR PREPAID MOBILE PAYMENT STAGING ACCOUNTS

CROSS REFERENCE TO RELATED APPLICATION(S)

This application claims the benefit of U.S. patent application Ser. No. 14/050,448, filed on Oct. 10, 2013, which is now U.S. Pat. No. 9,542,673 issued on Jan. 10, 2017, and of U.S. Provisional Patent Application No. 61/711,922 filed on Oct. 10, 2012, the contents of which are hereby incorporated by reference for all purposes.

BACKGROUND

Payment cards such as credit or debit cards are ubiquitous. For decades, such cards have included a magnetic stripe on which the relevant account number is stored. To consummate a purchase transaction with such a card, the card is swiped through a magnetic stripe reader that is part of a point of sale (POS) terminal. The reader reads the account number from the magnetic stripe. The account number is then used to route a transaction authorization request that is initiated by the POS terminal.

In pursuit of still greater convenience and more rapid transactions at POS terminals, payment cards have more recently been developed that allow the account number to be automatically read from the card by radio frequency communication between the card and a so-called "proximity reader" which may be incorporated with the POS terminal. In such cards, often referred to as "proximity payment cards" or "contactless payment cards", a radio frequency identification (RFID) integrated circuit (IC, often referred to as a "chip") is embedded in the card body. A suitable antenna is also embedded in the card body and is connected to the RFID chip to allow the chip to receive and transmit data by RF communication via the antenna. In typical arrangements, the RFID chip is powered from an interrogation signal that is transmitted by the proximity reader and received by the card antenna.

MasterCard International Incorporated, the assignee hereof, has established a widely-used standard, known as PayPass™, for interoperability of proximity payment cards and proximity readers. Other proximity payment schemes are also increasingly in use.

It has been proposed that the capabilities of a contactless payment card be incorporated into a mobile telephone, thereby turning the mobile telephone into a contactless payment device. These devices are referred to herein as near-field communication ("NFC") handsets or NFC mobile devices.

Currently, there is significant effort and cost required for financial institutions that issue financial accounts to consumers ("issuers") to start issuing their financial accounts (such as credit card and debit card accounts) on NFC handsets. The effort, complexity and cost to develop systems necessary for deploying issuer financial accounts to a mobile device are significant entry barriers for many issuers. Many issuers simply desire to gain some experience with such a new form factor before committing to the high cost and effort of a full commercial roll out. Also, some issuers are seeking low initial entry costs and low effort because the number of NFC handset financial accounts may be very low for the foreseeable future. It would therefore be desirable to provide an intermediate solution for issuers that is cost effective and relatively quick for deploying payment accounts for NFC devices so that the issuers need not make an immediate large money and time commitment to invest in the systems that ultimately will be required.

DETAILED DESCRIPTION

Figure 1A:
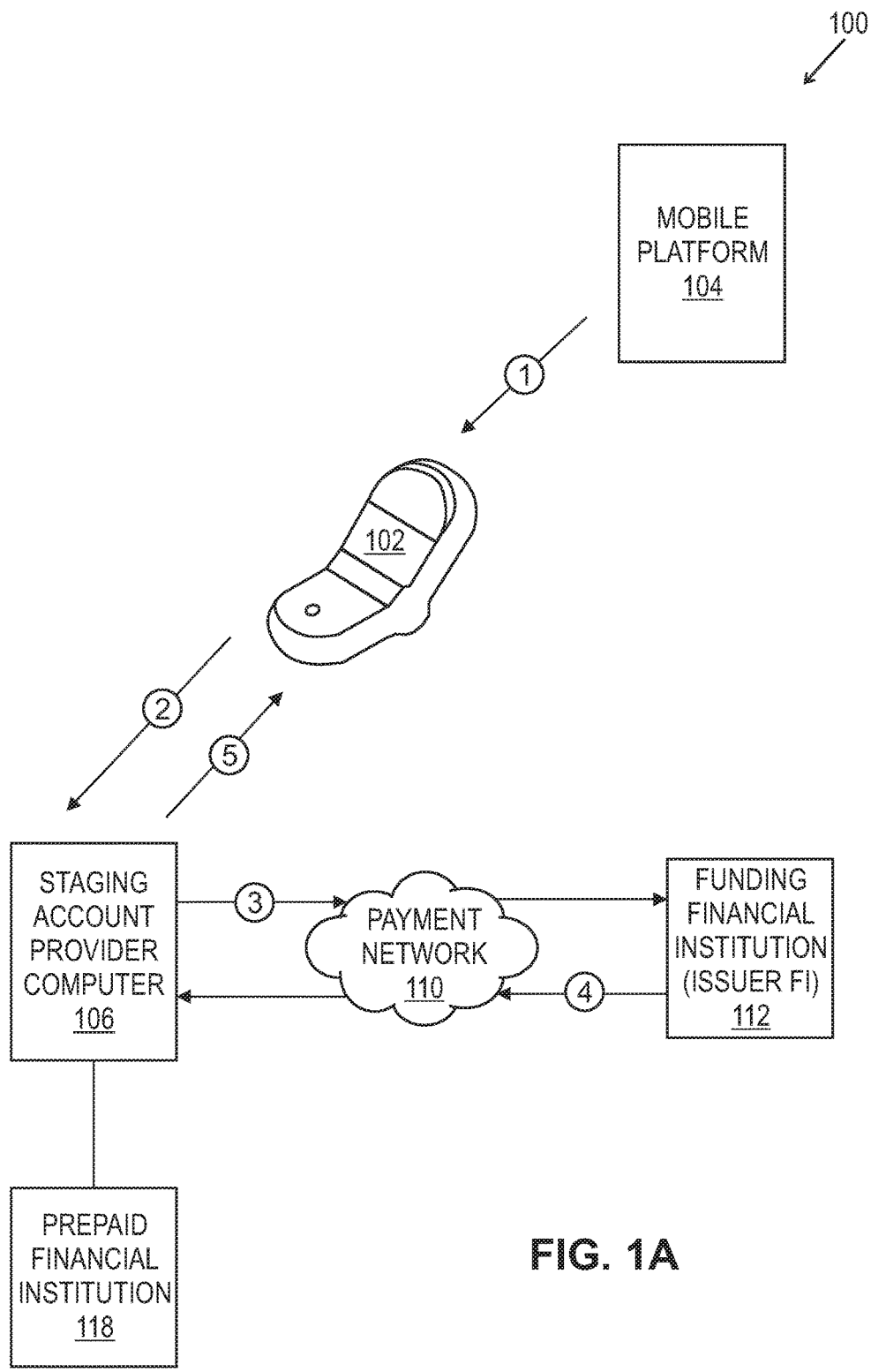
FIGS. 1A-1B are schematic block diagrams of a system pursuant to some embodiments in accordance with the invention.

Pursuant to some embodiments of the present invention, prepaid staging account systems and methods are provided that allow issuer financial institutions to quickly and efficiently launch NFC device payment programs. In some embodiments, the prepaid staging account is a general purpose reloadable prepaid account that is configured to look like another issuer's product, with that issuer's card image, messaging and branding (as used herein, the issuer is referred to as the "primary financial institution" or "primary issuer"). The prepaid staging account is reloaded or "topped-up" from a pre-determined credit or debit account operated by the primary issuer (the issuer that issued the original payment account that the staging account appears as). The primary issuer benefits in that they do not need to support NFC programs (such as PayPass™, which is service offered by MasterCard International Incorporated), chip transactions or Mobile PayPass™. The staging account issuer (the issuer that provides the prepaid staging account) uses economies of scale to cover the development effort required to offer the service, and thus may provide staging account services to a number of different primary issuer financial institutions.

As used herein, a "primary issuer" may be a bank or financial services institution and is the owner of the consumer's or end customers' primary card relationship. A "staging account provider" is the entity that will issue, distribute and manage a pre-paid account on a mobile device on behalf of the primary issuer. Thus, the staging account provider is expected to bring to the primary issuer the necessary relationships and practical knowledge to deploy mobile accounts so that the primary issuer can be provided with the ability to deploy mobile financial accounts to their customers in a cost effective and timely fashion. In addition, "mobile infrastructure components" may include one or more entities that will provide the functionality to personalize and manage the customer's handset or mobile device. In some implementations, the mobile infrastructure components may include one or more of a Trusted Service Manager (TSM), a Data Preparation Service (DPS), a Mobile Network Operator (MNO) and a post issuance management service(s).

In some embodiments, the prepaid staging account service may be provided as a business to business service, wherein providing staging account services is intended to be a commercial service offered to existing card account issuers allowing them to deploy a pre-paid mobile account that is attached to an existing cardholders "card-based" account. The staging account may be attached to any existing card account, such as a credit account, a debit account or a pre-paid account, and that card account may be based on a magnetic-stripe technology, or EMV technology, or PayPass™ technology. In particular, in some embodiments the service is provided under a direct relationship with, and paid for by, an existing card issuer or primary issuer. Thus, the staging account provider may sell or otherwise provide the service to one or more primary issuers who then may promote the product to their cardholders. The staging account is therefore constructed such that the consumer (the cardholder) has a direct relationship with only the primary issuer and not the staging account provider.

In some embodiments, the staging account is an online pre-paid account that is configured effectively as a companion product to an existing customer's payment card account. But in some implementations the staging account primary account number (PAN) that is issued for use with the cardholder's mobile device is different than the PAN of the cardholder's payment card account. The cardholder's mobile device therefore does not replace the payment card account but instead may be considered as a companion device to it. Accordingly, the staging account may be branded and marketed as a sub-account of a cardholders existing payment card account. The pre-paid balance used to authorize and settle transactions using the staging account, although implemented as an on-line prepaid balance, can effectively be considered as an "off-line balance" to the card account. However, in accordance with some embodiments, the cardholder may utilize his or her mobile device to monitor and top-up the balance that is available for the staging account. As will be explained in more detail below, cardholders may be able to utilize and/or authorize the use of an automated top-up function so that balance management from the cardholder is not necessary.

In some embodiments, the staging account is to only be funded from the customer's card account that was issued by the primary issuer. Thus, multiple funding source options are not available (in contrast to general purpose reloadable (GPR) prepaid accounts). Such operation is fundamentally in accordance with the staging account being configured as a companion product to an existing card account. Since the funding source is fixed, there is no option provided to allow other funding sources to be set-up. Thus, when the cardholder undertakes a top-up of their staging account, it is not necessary to select or enter details of the funding source because only one funding source exists.

Such a pre-paid staging account is used to achieve complete separation from the systems of the primary issuers and that of the account deployed to the mobile device. Thus, for example in the case of MasterCard International, Inc. requirements regarding a MasterCard Mobile PayPass™ (MMPP) account that is issued to the mobile device, the primary issuer does not need to process "MChip" or PayPass™ transactions. For many primary issuers this would otherwise require a very significant upgrade of their systems with associated costs, in addition to providing significant efforts required for mobile accounts issuance.

In order to meet the objective of providing a primary issuer with the ability to deploy mobile accounts to their customers in a cost effective and timely fashion, the staging account provider may offer one or more "packaged" options or "staging account programs". Such staging account programs include most or all of the technical development and business agreements that are required to provide a mobile account to a consumer's mobile device. Thus, a suitable staging account program allows a primary issuer to rapidly launch their mobile accounts program.

Pursuant to some embodiments, the cardholders or users (who are also mobile device users) will enjoy a user experience such that they will likely be unaware that a third party staging account provider is involved in the process (although in some implementations the relationship between the primary issuer, the staging account provider and the consumer will be expressed in cardholder materials that include terms and conditions regarding the service). For example, in some embodiments, the primary issuer may refer to the staging account as the "cardholders mobile account" when providing transaction information and/or documentation to a customer. In addition, in some implementations the primary issuer does not permit internet purchases by use of a mobile device, and places limitations on the maximum monetary amount allowed per transaction. Thus, the primary issuer may further describe and/or market the mobile account as being a "specially protected" account suitable for lower value payment transactions with added security protection to prevent fraud.

When the cardholder uses the payment card issued by the primary issuer, all authorization and settlement messages are routed to the primary issuer during normal transaction processing. In accordance with the embodiments described herein, when a cardholder uses the payment account on his or her mobile device, all authorization and settlement messages are routed to the staging account provider. The staging account provider authorizes and settles these transactions using the pre-paid balance that has been funded from the cardholders account with the primary issuer.

Reference is now made to FIG. 1A in which a system 100 pursuant to some embodiments is shown. The system 100, as depicted, includes a number of entities or devices that interact to provision or initialize a prepaid staging account for use by a mobile device 102 belonging to a consumer or customer. Pursuant to some embodiments, the mobile device 102 is an NFC enabled device, the details of which are described herein in conjunction with FIG. 2. The mobile device 102 is operated by a consumer who wishes to add payment functionality to the mobile device 102. While only a single mobile device 102 is shown in FIG. 1, those skilled in the art, upon reading this disclosure, will appreciate that many mobile devices may be involved in the system.

The mobile device 102 is in communication with a mobile platform 104 and a staging account provider 106, both of which may include one or more computers and/or computer systems. Communication between the mobile device 102 and the mobile platform 104 and the staging account provider 106 may be over one or more network communication links, such as, for example, wireless communication links. For example, the communication between the mobile device 102 and the mobile platform 104 may be over a cellular network connection, the Internet (or other direct wired, or wireless connection, including without limitation, WiFi, near field communication (NFC) or the like), and communication between the mobile device 102 and the staging account provider 106 may be over the Internet, a computer network, or the like.

The staging account provider 106 is in communication with one or more issuing financial institutions 112 over a payment network 110. In some implementations, the issuer financial institution 112 has entered into a commercial agreement with the staging account provider 106 that includes terms including how exceptional transaction items will be handled. The terms may also define consumer enrollment options, cardholder charges, cardholder terms and conditions, marketing the solution, and enrolling cardholders who wish to benefit from a mobile payment account. The terms also indicate the entity responsible for carrying out customer service and how this is communicated to the cardholder (which may be undertaken in-house by the issuer or implemented with the assistance of services provided by the staging account provider). The primary issuer also agrees to the type of digital wallet and User Interface (UI) that will be provided to cardholders, together with any branding elements and how the card image is to appear on the mobile device. In addition, the primary issuer agrees to the top-up methods that will be available to cardholders and any transactional, daily or weekly limits that may be imposed, and agrees to the deployment methods to be used to deliver mobile accounts to the cardholder's handset, and which handsets and/or networks will be supported (which may be defined by a staging account program). The primary issuer must also sign-off on such matters as fraud liabilities, lost payment card and/or mobile device scenarios, how returns (for example, of purchased merchandise) and/or chargebacks are handled, and how transactions declines due to insufficient funds are handled.

Referring again to FIG. 1A, The payment network 110 may be, for example, a payment network such as the BANKNET® network operated by MasterCard International Incorporated or other payment networks (such as the VISANET® network operated by Visa International Service Association). Payment networks are operable to route payment card account purchase transactions from acquirer financial institutions (that serve merchants) to issuer financial institutions, and also support the transfer of funds from a funding account at the issuer financial institution to a destination account (which may be a merchant account) at a different or the same financial institution. In some implementations, the staging account provider 106 is associated with a prepaid financial institution 118 which is the financial institution issuing and maintaining the staging accounts pursuant to some embodiments.

As depicted in FIG. 1A, several interactions occur to allow a prepaid staging account to be provisioned on a mobile device 102. For convenience and ease of exposition, the interactions are labeled as arrows or items "1"-"5" and are numbered in a sequence which represents one possible sequence for provisioning a prepaid staging account. Those skilled in the art will appreciate that other sequences or flows may be used.

At item "1" (which may occur after a pre-paid staging account request—not shown—by a consumer or user of a mobile device has been made), an over-the-air ("OTA") message may be received by the mobile device 102 that includes data used to provision a prepaid staging account on the device 102. In some implementations, the data for provisioning the prepaid staging account is transmitted from a mobile platform 104. The mobile platform 104 may be operated by or on behalf of an entity such as MasterCard International Incorporated as a service to provision accounts on mobile devices. For example, in some embodiments the mobile platform 104 is or includes an over-the-air (OTA) provisioning service that allows NFC payment applications to be configured and transmitted to a mobile device 102 for installation and usage by the mobile device 102. As a specific illustrative (but not limiting) example, the mobile platform 104 may include one or more server computers operating the MasterCard Mobile Over-The-Air Provisioning Service ("MOTAPS") to cause the remote personalization of a payment application on mobile devices 102.

Pursuant to some embodiments, the payment account provisioned at step "1" is associated with a prepaid staging account, which includes account information associated with the cardholder (the owner or operator of the mobile device 102) and an associated prepaid staging account held at a staging account provider 106 (or more particularly at a prepaid issuer 118 associated with the staging account provider 106). The payment account information associated with the mobile device 102 allows transactions involving the mobile device 102 to be routed to the staging account provider 106 and the prepaid issuer 118. For example, the payment account information may include a routing identifier (such as a bank identification number or "BIN" associated with the prepaid issuer 118) that causes transactions involving the payment account to be routed to the staging account provider 106 and prepaid issuer 118 for processing (as will be described further below in conjunction with a purchase transaction depicted in FIG. 1B). Thus, in some embodiments, the data transmitted to the mobile device 102 may include metadata associated with the funding account, for example, account description data that may include a card layout descriptor (which informs the payment application how to present information associated with the funding account on the display device) and/or product type data that indicates the type of funding account (such as a credit card account, debit card account, prepaid debit card account, or other financial product type). The product type data may be used, for example, to control the type and amount of interchange associated with transactions involving the payment application.

At item "2", an interaction is shown between the mobile device 102 and the staging account provider 106. This interaction may occur after the mobile device 102 has initiated communication with the mobile platform 104 based on a consumer's indication of interest to begin the provisioning process, and may be a request to associate a desired funding account with the staging account. The interaction at "2" may be over a cellular network (e.g., "over-the-air") or it may be over a data connection (such as over the Internet). In some embodiments, the interaction labeled as item "2" may occur automatically after completion of the interaction labeled as item "1" (e.g., a consumer operating a mobile device 102 may automatically be prompted to provide information about a desired funding account to be associated with the prepaid staging account as soon as the initial provisioning of the account is completed).

Processing associated with item "2" may include presenting the customer with a series of user interfaces (displayed on a display screen of the mobile device 102) prompting the customer to enter information associated with a funding account to be used to fund the prepaid staging account. The funding account may be a financial account associated with credit card, debit card, or a bank account issued by an "issuer" 112 (or "primary issuer"). Once the customer enters information associated with the funding account, the customer may be prompted to enter any other information required to comply with relevant regulatory requirements (such as "know your customer" or "KYC" information). The staging account provider 106 may cause a request message to confirm the status of the funding account (e.g., as a request transmitted over the payment network 110 at item "3"). The payment network 110 routes the authorization request to the primary issuer 112 (the issuer of the funding account selected by the customer) for authorization. If the request is authorized, an authorization response is provided by the primary issuer 112 (e.g. a response transmitted over the payment network 110 at item "4") and returned to the staging account provider 106. The funding account is then associated with the prepaid staging account, allowing the prepaid staging account to be used to conduct transactions as if it were the funding account.

A confirmation response is transmitted to the mobile device 102 at item "5" (e.g., to cause a payment application on the mobile device 102 to be updated for use to conduct payment transactions using the prepaid staging account). In some embodiments, the confirmation response provides information to the customer indicating the amount of funds that are available for use in the prepaid staging account.

Pursuant to some embodiments, the confirmation response (or a separate message) also includes information about the funding account, such as card image information associated with the funding account (e.g., if the selected funding account was the customer's "United Signature MasterCard" issued by Chase Bank, the confirmation response may include the card image for that card, so that the payment application on the customer's mobile device 102 may appear as if it is the customer's "United Signature MasterCard"). That is, the payment application on the mobile device 102 appears to the customer or mobile device user as if it is the funding account and not the prepaid staging account.

In some embodiments, a mobile device provider (not shown, which mobile device provider may be associated with the mobile platform 104) may partner with a mobile staging account provider 106 and with one or more issuers 112 to offer mobile devices for sale to consumers that are pre-loaded with a prepaid mobile staging account application program. A consumer who purchases such a mobile device, such as a mobile telephone, may initialize or run the pre-loaded prepaid staging account application program to setup his or her own prepaid staging account. In this case, by definition the consumer already has a financial account with the issuer FI associated with or sponsoring the mobile devices that include the preloaded prepaid mobile device staging application program. Thus, in some embodiments, the consumer may touch an icon on a touch screen of his or her mobile device 102 to launch the preloaded prepaid mobile staging account application program, and then be presented with one or more user interface screens. The interface screens may include one or more blank data fields for the consumer to enter identification information which can be matched to a funding account at an issuer FI associated with the mobile device provider. The funding account may be a financial account associated with credit card, debit card, or a bank account issued by the consumer's issuer FI 112. In case one or more funding accounts are found, the consumer may be prompted to select which account to use to fund his or her prepaid mobile staging account. Once the consumer provides adequate information, the prepaid staging account will be established, and the funding account will be used to fund it.

In some embodiments, data entered by the consumer during enrollment for the mobile staging account service is transmitted to the staging account provider 106, which then confirms that the funding account exists (for example, the staging account provider may transmit a message via the payment network 110 to the consumer's issuer FI 112 requesting account verification). After the staging account provider receives an authorization message from the consumer's issuer FI, the funding account is associated with a prepaid mobile staging account. A confirmation message may then be transmitted by the staging account provider 106 to the consumer's mobile device indicating successful setup, and in some embodiments, indicating the amount of money funding the prepaid mobile staging account. After such a confirmation message is transmitted, prepaid mobile staging account is ready for use by the consumer to conduct purchase transactions as if it were the funding account.

Figure 1B:
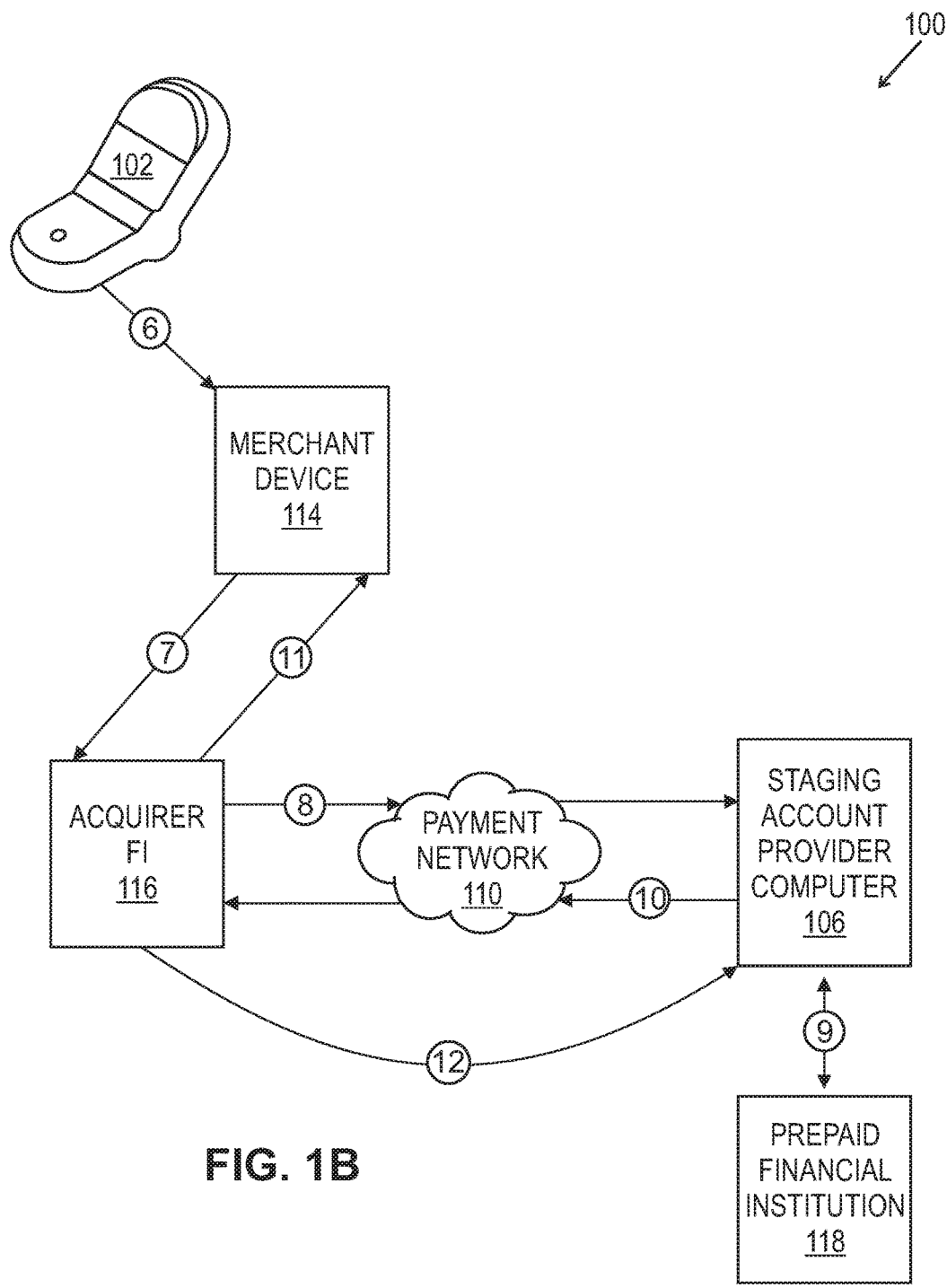

Reference is now made to FIG. 1B which is a further view of the system 100 and which depicts several interactions that may occur during a transaction involving the mobile device 102 and the prepaid staging account that was already created (and funded) as described above, for example, with regard to FIG. 1A. In particular, FIG. 1B shows interactions between a mobile device 102, a merchant 114, an acquirer financial institution 116, a payment network 110, a staging account provider or processor 106 and a prepaid financial institution 118. The interaction begins when a customer having a mobile device 102 with a prepaid staging account application stored thereon (that has been initialized or provisioned pursuant to a process such as shown in FIG. 1A) chooses to use his or her mobile device 102 (and thus the prepaid staging account) to conduct a purchase transaction at a merchant 114.

Accordingly, at arrow "6", the consumer may present, tap or wave the mobile device 102 on or proximate to a NFC reader device (not shown) associated with the merchant 114 during a purchase transaction (for example, tapping the mobile device near a point-of-sale (POS) device having an integrated NFC reader). The NFC reader device and the mobile device 102 interact to provide payment account information from the mobile device 102 to the NFC reader device for use in the transaction. The merchant 114 then transmits or provides the payment account information in a transaction authorization request message to an acquirer 116 (at "7"). The acquirer transmits (at "8") the transaction authorization request message to a payment network 110 for routing to the staging account provider or processor 106. The transaction authorization request message may be routed to the staging account provider 106 based on the bank identification number (BIN) associated with the payment account provided from the mobile device 102. The staging account provider 106 may check with the prepaid financial institution (at "9") to determine if the consumer's payment account has adequate funds for the purchase transaction. If the payment account has sufficient funds to complete the transaction, an authorization response message is returned from the staging account provider or processor 106 to the acquirer 116 (at "10"—through payment network 110), and the acquirer then passes the authorization to the merchant 114 (at "11") to complete the transaction. In some embodiments, clearing and settlement processing for the transaction are performed using standard payment processing techniques.

While the acquirer 116 may interact with the prepaid staging account processor 106 over the payment network 110, in some embodiments, one or more alternate paths may be provided. For example, in some embodiments the acquirer 116 may interact directly with the staging account provider 106 (indicated as item "12") instead of going through a payment network 110.

In some embodiments, the functionality developed by the staging account provider is generic, but it should be recognized that one prepaid construct and one set of partnerships will not meet the requirements of all primary issuers. Consequently, in order to meet the objectives of the staging account which includes easily and quickly deploying mobile accounts to the cardholders of a primary issuer, the staging account provider may develop several "staging account programs" at least one of which can be utilized immediately by a primary issuer. Such staging account programs may represent several pre-packaged solutions that meet the requirements of one or more primary issuers in a particular region. For example, the staging account provider may initiate a "MasterCard mobile prepaid program" (MMPP) for deployment to a secure element of the mobile device that is denominated in the appropriate currency for the primary issuer's market, and may have one or more user interfaces (UI's) and digital wallets for one or more handset ranges that have been set up and approved for deployment. In addition, the staging account provider may have agreements with one or more secure element owners (such as Mobile Network Operators (MNOs)) to allow the staging account to be loaded into their universal integrated circuit cards (UICCs) or subscriber identity module cards (SIM cards), and/or with one or more mobile device (handset) providers to allow the staging account to be loaded into an embedded secure element (SE) resident within the mobile device. The staging account provider will have also integrated with all parties necessary (for example, Trusted Service Managers (TSMs) and the like) to allow the staging account to be provisioned to a consumer's mobile device, and have a range of supporting services (including documentation) available to the primary issuer that covers top-ups (funding of the mobile account), customer support, and enrollment. The staging account provider may also have a draft agreement available for consideration by primary issuers that includes commercial terms for engaging the staging account provider and for utilizing an appropriate staging account program. Although a staging account provider may initially go to market with only one staging account program, it is contemplated that over time the staging account provider will develop multiple staging account programs for consideration by primary issuers, and will have the ability to develop bespoke or customized programs when and where the business opportunity justifies it.

In order to meet some primary issuer requirements, for example, an existing staging account program may need to be extended to add an additional secure element (SE) owner within an existing market, or a new staging account program may need to be created where a program has not already been created for the market required. This may result in additional costs and setup time, but the staging account provider is expected to be able to deliver in a cost effective and timely manner by using their experience and existing market relationships.

The staging account provider may also offer one or more methods to provision the secure element of a mobile device. Although over-the-air (OTA) provisioning is ideal for mass deployment opportunities, it can be a complex and expensive provisioning option to set up. Thus, in the case of the primary issuer intending a small mobile staging account trial (or limited issuance), other options may be more cost effective. For example, if a handset and UICC is being issued to the cardholder on sign-up to the mobile service, then pre-configuration of the mobile device for a staging account prior to dispatch may be an option. In cases where the cardholder already has a mobile handset and UICC that includes the SE, re-issuance of a replacement UICC to the cardholder may be an option. Thus, in some embodiments it is the responsibility of the staging account provider to identify and offer provisioning options that are applicable for the actual circumstances of each target market (i.e., country).

Figure 2:
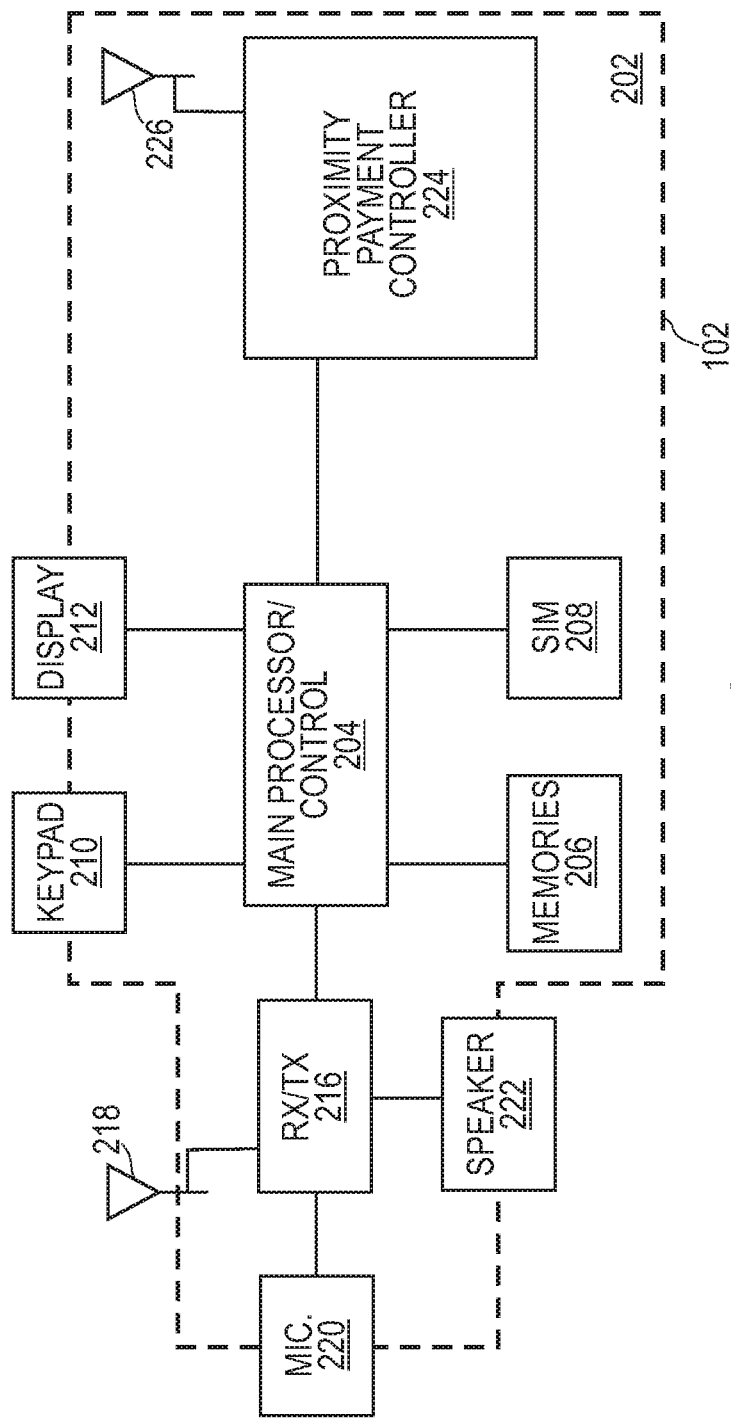
FIG. 2 is a schematic block diagram of the mobile telephone shown in FIGS. 1A and 1B.

FIG. 2 is a block diagram of an example of the mobile device 102 shown in FIGS. 1A and 1B. In its hardware aspects the mobile device 102 may be entirely conventional, and indeed in most or all of its software aspects it also may be conventional, and may provide novel functionality as described herein through interaction (via interaction with merchant device 114 of FIG. 1B) with a personalization server. In other embodiments, however, novel functionality as described herein may result at least partially from software and/or firmware that program the mobile device 102 as well as through interaction with other devices, such as a merchant's retail terminal (such as a point of sale (POS) device or cash register) or other merchant device (such as a NFC reader and the like).

The mobile device 102 may include a conventional housing (indicated by dashed line 202) that contains and/or supports the other components of the mobile device 102. The mobile device 102 further includes conventional control circuitry 204, for controlling over-all operation of the mobile device 102. Preferably the control circuitry 204 is suitably programmed to allow the mobile device 102 to engage in data communications and/or text messaging with other devices, and to allow for interaction with web pages accessed via browser software, which is not separately shown. Other components of the mobile device 102, which are in communication with and/or controlled by the control circuitry 204, include: (a) one or more memory devices 206 (e.g., program and working memory, and which may include one or more secure portions or secure elements, and the like); (b) a conventional SIM (subscriber identification module) card 208; (c) a conventional keypad 210 (or touch screen) for receiving user input; and (d) a conventional display 212 (or, again, touch screen) for displaying output information to the user.

The mobile device 102 also includes conventional receive/transmit circuitry 216 that is also in communication with and/or controlled by the control circuitry 204. The receive/transmit circuitry 216 is coupled to an antenna 218 and provides the communication channel(s) by which the mobile device 102 communicates via the mobile network (not shown). The mobile device 102 further includes a conventional microphone 220, coupled to the receive/transmit circuitry 216. Of course, the microphone 220 is for receiving voice input from the user. In addition, a loudspeaker 222 is included to provide sound output to the user, and is coupled to the receive/transmit circuitry 216.

The mobile device 102 may also include an integrated circuit (IC) or chipset 224 of the kind embedded in contactless payment cards. For example, the IC 224 is connected to an antenna 226 and (once the mobile device 102 has been personalized, as described below) operates so as to interact with an RFID/NFC proximity reader of a POS terminal to provide a payment card account number for a purchase transaction at the POS terminal. For example, the IC 224 may be designed and/or programmed to operate in accordance with the above-mentioned PayPass™ standard.

Figure 3:
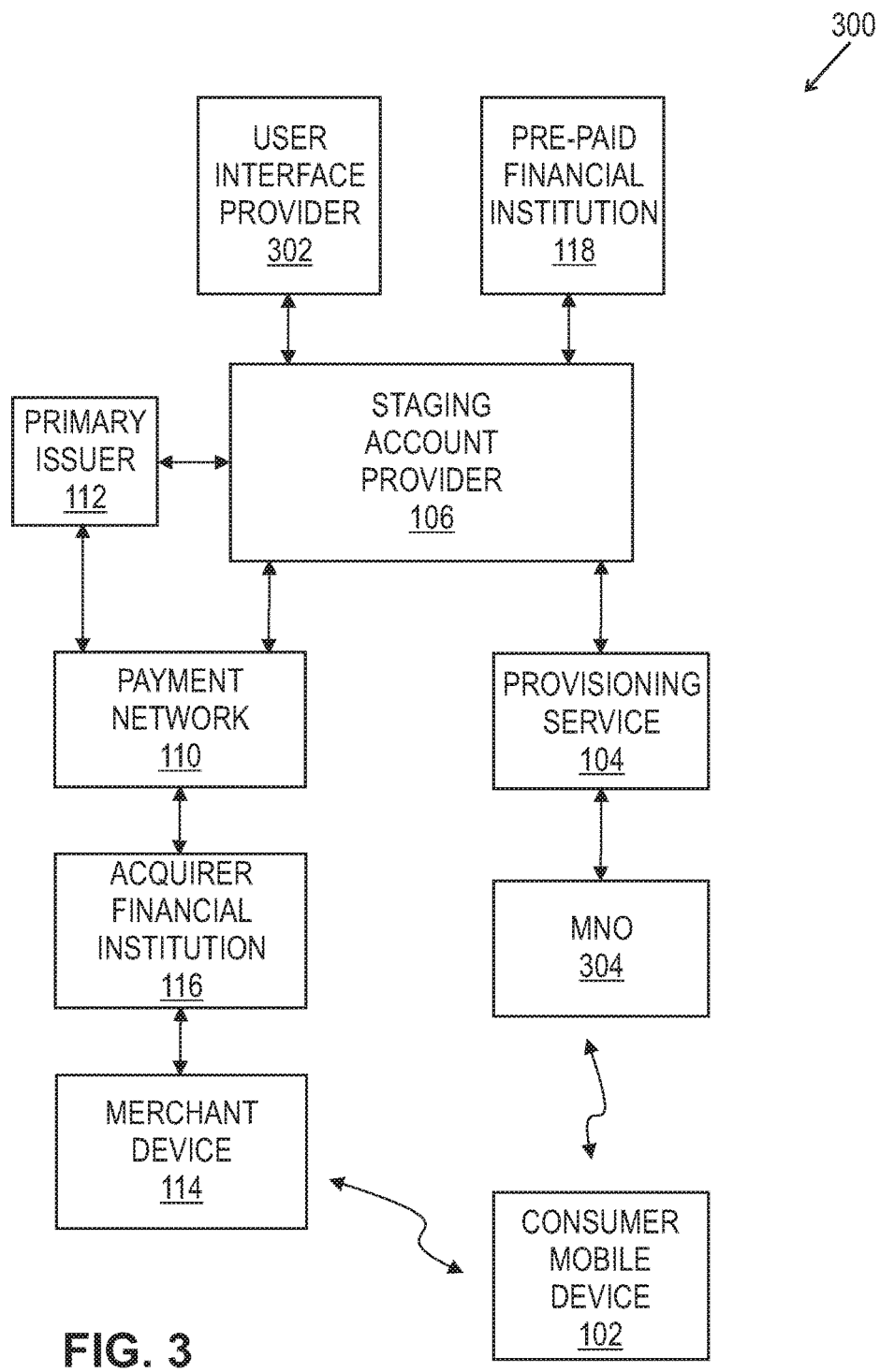
FIG. 3 is a block diagram of the components of a staging account system for accommodating mobile device provisioning and payment transactions according to an embodiment of the invention.

FIG. 3 is a block diagram of the components of a staging account system 300 for accommodating mobile device provisioning and payment transactions according to an embodiment. For ease of understanding, one block is shown as representing a staging account provider computer 106, a user interface (UI) provider computer 302, a prepaid issuer computer 118, a primary issuer computer 112, a payment network 110, a provisioning service computer 104 and a mobile network operator (MNO) 304, but it should be understood that each block may represent multiple computers and/or computer systems configured to function as described herein. The staging account provider computer 106 is configured for communications with a user interface (UI) provider computer 302, a prepaid financial institution (FI) computer or prepaid issuer computer 118, a primary issuer computer 112, a payment network 110 (such as the BANKNET® network mentioned above) and a provisioning service computer 104. The provisioning service computer 104 is configured for communications with a mobile network operator (MNO) 304, which is operable for communicating with a mobile device 102 of a cardholder (a consumer). The payment network 110 is configured for communications with an acquirer financial institution computer 116, which is configured for communications with a merchant device 114, and the merchant device is configured for communications with the mobile device 102. The payment network 110 is also configured for communications with the primary issuer 112.

The staging account provider computer 106 includes a number of interfaces to facilitate the transfer of data to operate the staging account. For example, some embodiments require the staging account provider computer 106 to include a BANKNET® interface to process all staging account transactions that are routed from an acquirer financial institution to the staging account provider. This is a standard issuer processor function, and thus is subject to pre-defined specifications, rules and certifications (such as those defined for MasterCard Service Provider Third Party Processors (MSP TPP)), and accordingly the staging account service does not impose any additional requirements on this interface. In addition, the staging account provider computer 106 must include a provisioning service interface for each trusted service manager (TSM) and/or trusted service provider (TSP) that the staging account provider utilizes to provision the staging account onto a mobile device (such as a cell phone), and a primary issuer interface for each primary issuer (financial institution) that utilizes the staging account service of that staging account service provider 106.

In some embodiments, the provisioning service interface between the staging account provider computer 106 and the provisioning service computer 104 is operated in accordance with the MasterCard® Mobile Provisioning Framework (MMPF), which is subject to an independent detailed specification and is outside the scope of this disclosure. It should be understood, however, that implementations require the staging account provider and the provisioning service to support trials and/or low volume deployments, in addition to over-the-air (OTA) provisioning, local issuance and re-issuance of the UICC (or SIM card). In particular, when a consumer purchases a handset and/or mobile device package, he or she may have the staging account provisioned directly by the retailer. In some implementations, such provisioning may be conducted using an OTA process which may be cost effective in addition to providing an improved customer experience. In some embodiments, the retailer instigates and oversees the provisioning of the UICC (or the embedded secure element (SE)), including downloading the user interface (UI) and digital wallet into the handset. In some implementations, the retailer receives sufficient training, and therefore has experience with the process (from undertaking it for previous customers) so that any problems that may occur can be easily rectified. In some other embodiments, instead of using an OTA process or local issuance to provision the mobile staging account, a new UICC (or SIM card) is sent to the consumer to replace their existing UICC (or SIM card). Such an UICC is fully provisioned in the mobile network operator's (MNO's) personalization bureau, and the MNO provides instructions for the cardholder regarding how to download a UI and a digital wallet application onto their handset (a relatively straightforward process).

The staging account provider also includes a plurality of primary issuer interfaces that correspond to each primary issuer (financial institution) that utilizes the staging account services. The primary account interface supports primary issuer requests to issue a new staging account, to access account information (and for changing the account configuration, where appropriate), to access account activity (for customer statements, regulatory reporting and benefit accruals), and to provide account top-ups. Thus, in some embodiments a secure (and authenticated) channel is set up between the staging account provider and each primary issuer that utilizes the services of the staging account provider. The use of a secure channel is the responsibility of each primary issuer, and thus a primary issuer implements any controls necessary to prevent unauthorized use of the services within their own organization. In some embodiments, the staging account provider also provides a "white label" web-portal for use by cardholders of a particular primary issuer, and such a web-portal may also be provided through a secure channel to the primary issuer. The primary issuer is thus responsible for authenticating the cardholders before allowing them access to the web-portal.

With regard to staging account top-ups, the interface between the staging account provider and the primary issuer may be implemented in any of a number of ways. For example, for trials and smaller deployments, a normal payment transaction can be submitted through a payment network (such as BankNet®) to the primary issuer to authorize and settle funds. In order to ensure a good cardholder experience, a primary issuer configures its authorization system to recognize the staging account provider as a trusted merchant, and to not apply "quasi-cash" or "cash advance" fees to the top-up transactions. With regard to larger deployments, where transactional costs must be minimized, the staging account provider and primary issuer in some embodiments implement a proprietary connection to allow top-up transactions to be processed more cost effectively. Such a proprietary connection beneficially results in no interchange passing between the staging account provider and the primary issuer, and the costs and revenue generated can be subject to conditions defined in the business services agreement. In addition, in such cases MasterCard BankNet® charges will not be due because the transactions are not routed through the BankNet® payment network. However, it should be noted that implementation of a proprietary connection will involve additional set-up and configuration costs for both the primary issuer and the staging account Provider.

The staging account provider also enters into commercial agreements with partners in order to deliver the staging account service. In particular, the staging account provider 102 and the User Interface (UI) provider 302 must have an agreement that defines the terms and the conditions under which a user interface (and the digital wallet) may be issued and used by the primary issuer's cardholders. The staging account provider 106 and the primary issuer 112 must also have a commercial agreement regarding items such as the fees to be charged by the staging account provider to the primary issuer to set up and maintain the staging accounts for their customers. In addition, the staging account provider has commercial agreements with one or more pre-paid financial institutions (or bank identification number (BIN) sponsors) who issue the pre-paid accounts that are companion accounts to those issued to the consumer but which are utilized as the consumer's mobile device account. Moreover, the staging account provider has commercial agreements with one or more provisioning service vendors so that the staging accounts can be deployed to mobile handsets of consumers. These agreements may be complex, as multiple parties and/or organizations may be involved (such as handset providers, UICC providers and eligibility check service providers). Also, in some embodiments, the staging account provider needs to have a commercial agreement with one or more mobile network operators (MNOs) so that access can be obtained to a secure element (SE) of the consumer's mobile devices.

It should be recognized that utilizing a prepaid staging account and a staging account provider as described herein may introduce additional expense per transaction for a primary issuer. In some cases the additional expense may be covered by the interchange fees earned from transactions undertaken with a mobile device (yielding a small profitable margin), however in some cases the interchange fees earned may be insufficient to cover all costs, and the primary issuer may be expected to cover such costs. Therefore, such a configuration or system may not be commercially viable (or sustainable) for larger mobile device payments deployments. But due to the lower set-up costs, such a configuration or system is viable and/or cost effective for smaller programs, for example, for issuers who want to carry out a mobile payments pilot before deploying large scale mobile solutions ("try before you buy"). In addition, small to medium-size banks looking for a cost-effective mobile payments deployment with minimal effort or upfront investment costs may find it attractive to utilize the systems and/or processes described herein. In addition, a primary issuer may market the mobile account as a 'Cardholder Benefit' which the primary issuer uses to enhance the loyalty of existing cardholders, or as a marketing tool to win new cardholders. In some cases, the primary issuer may be able to apply an additional charge to the cardholder for the mobile account service to cover all costs, for example, by charging an annual fee, or a monthly fee, or a per-transaction fee, or some combination thereof.

Figure 4:
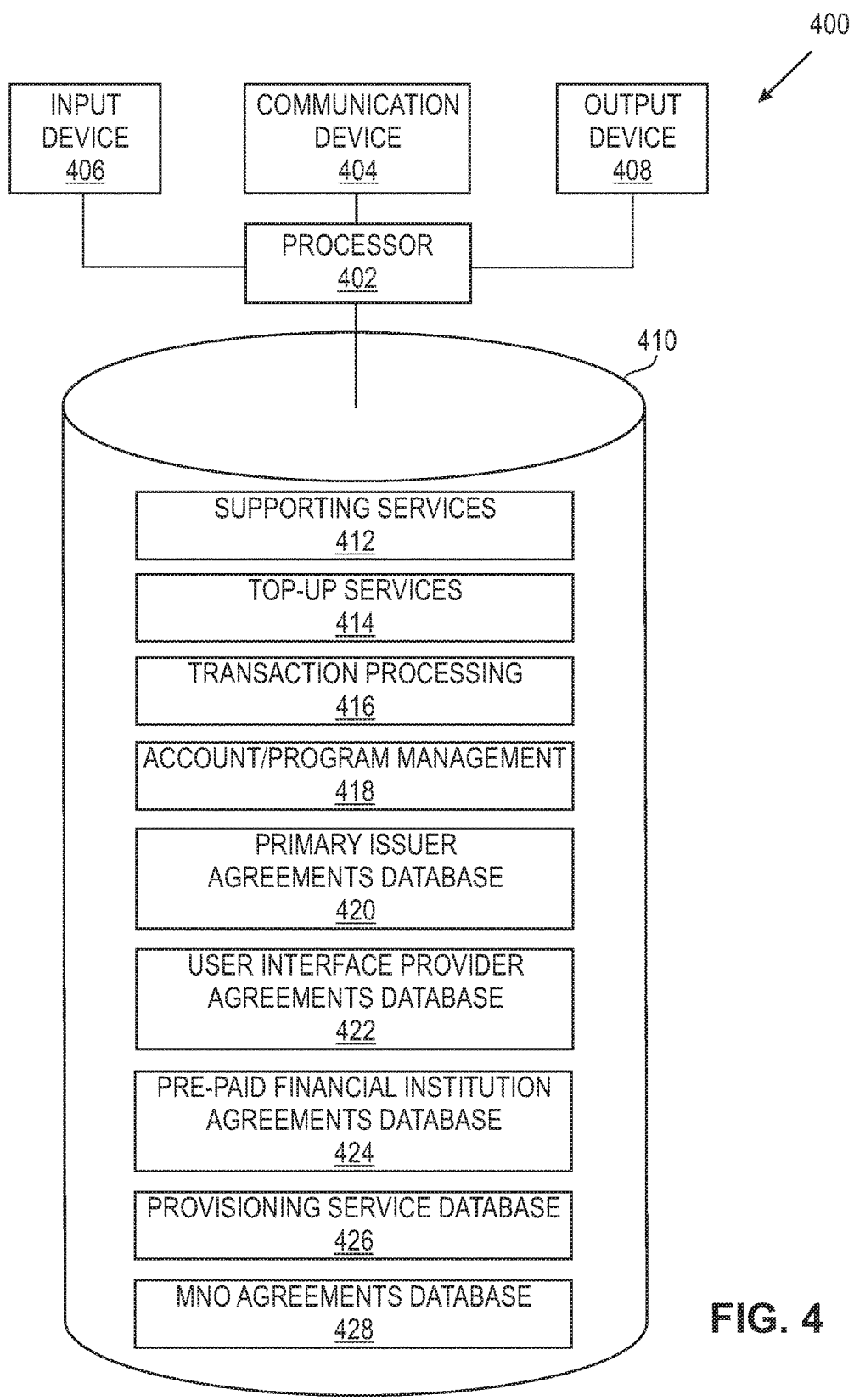
FIG. 4 is a block diagram illustrating a staging account provider computer system according to an embodiment of the invention.

FIG. 4 is a block diagram illustrating an embodiment of the staging account provider computer system 400.

The staging account provider computer system 400 may be conventional in its hardware aspects but may be controlled by software to cause it to operate in accordance with the processes described herein. For example, the staging account provider computer system 400 may be constituted by conventional server computer hardware.

The staging account provider computer system 400 may include a computer processor 402 operatively coupled to a communication device 404, an input device 406, an output device 408, and a storage device 410.

The computer processor 402 may include one or more conventional processors, such as those manufactured by Intel Corporation and/or the AMD Company. Processor 400 operates to execute processor-executable steps, contained in program instructions described herein, so as to control the staging account provider computer system 400 to provide desired functionality.

Communication device 404 may be used to facilitate communication with, for example, other devices (such as computers or computer systems 302, 104, 110, 112 and 118 shown in FIG. 3). For example, communication device 404 may comprise numerous communication ports (not separately shown), to allow the staging account provider computer system 400 to provide data and/or services simultaneously to numerous client computers.

Input device 406 may comprise one or more of any type of peripheral device typically used to input data into a computer. For example, the input device 406 may include a touchscreen, a keyboard and/or a mouse. Similarly, output device 408 may include one or more peripheral devices typically used to obtain data from a computer. For example, the output device 408 may include, for example, a display screen and/or a printer.

Storage device 410 may comprise any appropriate information storage device, including volatile and/or non-volatile types of memory. For example, the storage device 410 may include combinations of magnetic storage devices (e.g., magnetic tape and hard disk drives), optical storage devices such as CDs and/or DVDs, and/or semiconductor memory devices such as Random Access Memory (RAM) devices and Read Only Memory (ROM) devices, as well as flash memory. Any one or more of such information storage devices may be considered to be a non-transitory computer-readable storage medium or a computer readable medium.

Storage device 410 stores one or more programs or program modules for controlling processor 402. The programs comprise program instructions (which may be referred to as processor-executable instructions or computer readable program code means) that contain processor-executable process steps of staging account provider computer system 400, including, in some cases, process steps that constitute processes provided in accordance with aspects and/or principles of one or more embodiments described herein. The storage device 410 may also store one or more databases that include data that may be required and/or utilized for one or more processes describe herein.

The storage device 410 stores supporting services programs 412 for the purpose of providing primary issuer computers with access to services that assist in the deployment and management of mobile accounts. In some implementations, the services offered include enrollment services, set-up services, customer services and reporting services. In addition, in some embodiments the staging account provider may provide to the primary issuer value added services that may be branded by the primary issuer for direct use by their customers or cardholders. Such value added services may include a mobile application for the cardholder to directly manage their staging account. For example, a Web-portal and/or a call center (or IVR) may be available for the cardholder to directly manage their staging account. In addition, a remote message system (SMS or email) may be provided to inform cardholders of transactions, balance and top-up events on the staging account.

In some embodiments, the supporting services programs 412 include an enrollment application programming interface (API) for direct integration with the primary issuer computer system(s). But enrollment of cardholders may instead or additionally be implemented as a web-portal for use directly by primary issuer staff for use, for example, in smaller pilots and trials where the primary issuer wishes to avoid the cost of a full system integration. In any case, the enrollment service is implemented via an encrypted and authenticated link such that only authorized primary issuer systems (or staff) can access it.

The purpose of providing enrollment functionality is to capture all information required in order to set up a new staging account for a cardholder of a primary issuer, wherein the primary issuer has already requested such services from a staging account provider. The information that must be captured includes cardholder details (such as the name, address, date of birth, and contact information of the cardholder), mobile device details (such as the phone number, mobile network operator (MNO), the brand, model and/or type of mobile handset), primary account details (such as the card account number, the expiration date of the card account, the CVC2 number, and the like), and a passcode which is a secret passcode that is shared with the cardholder and used to validate that the phone is in possession of the cardholder at the time of provisioning. In addition, know your customer (KYC) data (which may be dependent on country regulations) may be captured (but in some cases may not be required), and data concerning certain options (where choices are available, the data indicates which options have been selected).

Under a business agreement between the staging account provider and the primary issuer, any KYC data that must be supplied will be set forth. However, in some cases regulatory requirements may not require a primary issue to actually pass KYC data to a staging account provider, but there may be a requirement to formally acknowledge that KYC data has been collected. Thus, in some embodiments, upon submission of a request to issue a new account, the data provided is checked (where possible) to ensure that it is complete and correctly formatted, and an acknowledgement message (or error message) is provided. Since a mobile device provisioning process takes some time, in some embodiments the primary issuer tracks the status of the request including the data provided through a customer services API and/or a Web-portal. As part of the provisioning service, the staging account provider (or TSM) transmits a number of messages to the consumer via SMS or other suitable messaging service, and the content and frequency of such messages is agreed upon between both parties (the staging account provider and the primary issuer) and included within the business services agreement.

The staging account provider is responsible for securing the bank identification number (BIN) range necessary (for example, via a BIN sponsor) for issuance of the staging accounts. Within this BIN range, the staging account provider allocates and generates staging account PAN numbers for the cardholders' mobile device accounts, and populates a mapping database to ensure that there is a one-to-one (1 to 1) correspondence for all staging accounts issued to the appropriate primary issuer and the cardholders corresponding debit card account or credit card account, for example. The mapping to the appropriate primary issuer is critical because, to achieve economies of scale, the staging account program can be shared by many primary issuers. It is important that the contractual terms, program options, and appropriate branding are correctly applied to all aspects of the staging account services provided for each staging account issued based on the program agreed upon between the staging account provider and each individual primary issuer. The fact that for many primary issuers the staging or mobile account service will be delivered using a shared program must be effectively invisible to their cardholders.

The staging account provider is responsible for selecting the data preparation service (DPS) and/or the trusted service manager (TSM) vendors (the provisioning service 104) that will carry out mobile provisioning on their behalf. Such entities may be selected based on existing relationships, and the type(s) of mobile devices that need to be provisioned. For example, MasterCard® International Inc. requirements include a provision that requires all such selected partners to be accredited by MasterCard®. Accordingly, the staging account provider is responsible for defining the technical requirements, business agreements, and interfaces with all the partners selected, and managing the end-to-end provisioning process on behalf of the primary issuer. As part of the provisioning process, a User Interface (UI) must be downloaded to each mobile device. The UI must be compatible with the mobile device, provide the functionality required, and be branded as required by the primary issuer. For example, the staging account provider may offer a primary issuer a UI built using the MasterCard® UI software development kit (SDK). The staging account provider also configures and customizes the UI in accordance with the requirements of the primary issuer in accordance with the business services agreement, and may be required to complete user acceptance testing (UAT) prior to rollout of the mobile accounts service with the primary issuer and all partners involved to ensure that that the provisioning processes works as required by the primary issuer.

In some embodiments, as part of the supporting services provided by the staging account provider, the primary issuer can access operational and status information for a staging account set up on their behalf and can search for a particular mobile account (staging account) based on one or more of the cardholder's name, the cardholders mobile telephone number, and/or the primary account number (the funding account). In some implementations, the staging account provider need not validate that the primary issuer is accessing the correct account, but for the purposes of providing audit functionality, transaction logging may be implemented. In addition, in some embodiments the primary issuer can utilize the API (or the Web portal) to view (and/or to update where applicable) the status of the mobile account or staging account (for example, status indications may include "Open", "Suspended", "Reported Lost/Stolen", or "Closed"), status of the provisioning process, any information regarding the SIM/UI or handset currently in use, the account balance (plus ability to undertake a top-up), the transaction history (including failed authorizations), and current account funding options (if any).

The transaction history for a staging account is made available by the staging account provider to the primary issuer as part of the supporting services so that the primary issuer can generate a cardholder statement for transmitting to the cardholder. But in some embodiments, other reports are provided to assist the primary issuer in managing the staging accounts being used by their cardholders. Such reports may be available upon request for a given period of time, and may include one or more of a report of high usage accounts, a report of dormant accounts, a report of accounts where an authorization has been declined, a report of accounts where a top-up has not been completed successfully, a report on all potentially fraudulent activity detected, a stator report required by law (see below), and/or a benefit accruals report (see below).

In some jurisdictions, a primary issuer is responsible for compliance with reporting requirements issued by, for example, a financial sector regulator in one or more of the territories in which the primary issuer operates. In order to satisfy such requirements, the staging account provider provides any such statutory reporting that is necessary. As part of the staging account construct, cardholder benefits available on the primary account card (the funding account) may be transferred at the discretion of the primary issuer to one or more transactions undertaken by the cardholder using their mobile account (their staging account). To facilitate such functionality, benefit accruals reporting may be agreed upon between the staging account provider and the primary issuer, for example, as part of the business services agreement. Thus, in some implementations the staging account provider is required to separately report transactions (or transactions values and/or volumes) on which the cardholder has earned a benefit (e.g. loyalty points), for example, as a benefits report. The staging account provider thus must have the flexibility to generate such benefits reports; however, the content and frequency of such benefit reports is subject to negotiation between the staging account provider and the primary issuer.

In addition, in some embodiments as part of the supporting services provided by the staging account provider, value added services can be provided that provide the cardholder with functionality directly from the staging account provider (instead of from the primary issuer). Such value added or "white label" services minimizes the effort and expense of the primary issuer to develop the functionality for such services to their cardholders themselves. However a key requirement for such white label services is that they are branded by the primary issuer so that the cardholder is unaware of the fact that the service is actually being provided by a third party (the staging account provider) instead of being provided by the primary issuer.

Referring again to FIG. 4, the storage device 410 also stores top-up services programs 414 that provide top-up options to cardholders according to rules provided by the primary issuer. In particular, the primary issuer determines what top-up options are available for their cardholders from options provided by the staging account provider 400. The options selected by the primary issuer can broadly depend on how the mobile payments solution is marketed to cardholders, and if the primary issuer permits their cardholders to manage their mobile account balance. For example, the staging account provider may allow automatic top-up so that, when the staging account balance (the mobile account balance) falls below a pre-determined value, the staging account is automatically topped-up to a pre-determined balance. The pre-determined levels can be set by the primary issuer based on, for example, the financial standing of the cardholder and/or that cardholder's usage profile.

The staging account provider may also offer semi-automatic top-up, which is similar to automatic top-up but requires the consent of the cardholder (typically obtained via a user interface (UI) on the mobile device) before the actual top-up is undertaken.

The staging account provider may also offer manual top-up. For example, the cardholder may be provided with a low balance warning when their balance falls below a pre-determined value, and it is then the responsibility of the cardholder to request (typically via the UI on the mobile device) a top-up for that staging account, and to specify the amount of money that should be topped-up.

In situations in which the cardholder had a transaction declined because its value is greater than the current available balance, and/or potentially the balance that would normally be achieved following an automatic or semi-automatic top-up, the staging account provider may offer (subject to primary issuer approval) the cardholder the ability to top-up the staging account by an amount sufficient to allow the transaction to be undertaken on a second attempt. The staging account provider may also provide functionality for a cardholder to set daily or weekly limits to the amount of funds that can be automatically topped-up (without the cardholder directly communicating with the primary issuer's customer services) as an added security feature. In addition, the staging account provider may provide functionality to limit the value of the maximum transaction (or top-up) that can be undertaken.

In some embodiments, when the prepaid staging account (the mobile account) is reloaded or topped-up with value (for example, after an automatic top-up has been performed to load value), the primary issuer may refer to such a transaction on the cardholder's primary account statement as "Transfer to Mobile Account" or "Transfer to Mobile Wallet" or the like. In some embodiments, when a transaction using the prepaid staging account is declined because of insufficient funds in the prepaid staging account, a display on the cardholder's mobile device may be provided which suggests one or more options to the cardholder (based on rules established by the funding account issuer). For example, the options for the cardholder may include: (1) asking the cardholder if he or she wishes to transfer additional funds into the mobile account, (2) prompting the cardholder to attempt the transaction again (in the meantime, the system may automatically perform a top-up to ensure that sufficient funds will be available to cover the transaction), or (3) prompting the cardholder to use their primary funding account payment card instead of using the mobile device. Those skilled in the art appreciate that other options may be available and may be presented to the cardholder on the mobile device display as well.

The storage device 410 also stores transaction processing services programs 416 because the staging account is a prepaid account that is configured and operated in accordance with business requirements. In some embodiments, transaction processing is undertaken in accordance with MasterCard International Incorporated prepaid rules and requirements.

Referring again to FIG. 4, the storage device 410 stores staging account/program management programs 418 that enable the staging account provider to manage the staging accounts for cardholders. However, the staging account provider is not responsible for marketing the program, or for managing cardholder relationships. These responsibilities instead are undertaken by the primary issuer, and the responsibility for some types of fraud is also passed to the primary issuer (wherein the fraud responsibilities are set forth in a business services agreement between the primary issuer and the staging account provider). However, in some embodiments legal liability still resides with the staging account provider and thus the staging account provider must manage the balance of all accounts and monitor for any fraud that may occur.

Fraud represents a cost to all payment account programs, and is normally built into account charges. Thus, in order to minimize the risk of fraud, restrictions are imposed on usage of a staging account so as to limit the opportunity for fraud to occur, and thus to result in reducing the cost of operating a staging account. In particular, in some implementations the staging account provider authorizes only "card present" or "chip" transactions, wherein the cardholder must physically tap or wave his or her mobile device near a reader device (such as an NFC reader). Card not present transactions (such as mail order, internet and/or recurring payment transactions) are not permitted through a staging account. Instead, if the cardholder wishes to engage in a card not present transaction, then he or she must use their primary account (if permitted) for such transactions (That is, the cardholder must utilize the PAN of his or her primary account instead of the mobile account PAN). Another restriction that may be applied is that the staging account shall only be funded from a previously nominated account held with the primary issuer such that cash loading and/or funding from other accounts is not be permitted.

Since the staging account provides an existing credit or debit cardholder with a companion account on a mobile device, the staging account provider does not have the ability to select (or validate) the cardholders who receive mobile accounts (instead, this is determined by the primary issuer). For this reason, and due to account limitations imposed under the business services agreement, the responsibility for some types of fraud are with the primary issuer. For example, the primary issuer is responsible for any fraud that occurs due to a lost or stolen payment card or mobile device, a fraudulent credit or debit account application, or an account takeover. In addition, the primary issuer is responsible for a cardholder "bust-out" fraud (the term "bust-out" refers to a hybrid credit and fraud problem that is also known as "sleeper" fraud, wherein a consumer applies for and uses credit, often under his or her own identity, with the intent of maxing out all available credit and then eventually disappearing without paying his or her bill).

Lost and/or stolen mobile device scenarios are complex when more than one payment device is issued on an account. If one device is lost or stolen, consideration must be given to how that will impact the use of other devices on the same account. For example, when a mobile device that includes a payment application funded by a staging account is lost or stolen, but the cardholder still retains his or her payment card, then the mobile device account (the staging account) is suspended pending re-issuance. Likewise, in the case where both the cardholder's payment card and mobile device including a payment application funded by a staging account is lost or stolen, then the mobile device account (the staging account) is suspended pending re-issuance (the primary issuer may also suspend the primary account). In the case where the cardholder's payment card is lost or stolen, but the cardholder still retains his or her mobile device, then the mobile device may not be permitted to be topped-up. In such a case, the primary issuer may link the staging account to a new funding source.

Furthermore, unlike a "payment card" there are a number of valid reasons why a cardholder may give his or her mobile device to a family member, friend or third party for use (for example, to make a phone call or, in the case of a smart phone, to check a fact by using a web browser). Thus, the staging account provider must be capable of supporting a temporary account suspension request by a cardholder (via the primary issuer) wherein the staging account provider functions to prevent the authorization of any transactions that may be attempted while the temporary account suspension is in effect. When the cardholder removes the temporary account suspension, then the staging account can be used in the normal fashion.

The storage device 410 may also store one or more databases for use by the staging account provider processor to manage accounts and/or provide services. For example, a primary issuer agreements database 420 may include terms and conditions that govern the engagement of the staging account provider by each primary issuer for issuing mobile accounts (staging accounts) on behalf of the primary issuers to existing cardholders. In some embodiments, in exchange for providing the services the staging account provider receives prepaid interchange revenue from the acquirer for each staging account transaction process. For operating the service, the staging account provider charges a fee to each primary issuer, which may depend on specific details of each agreement reached (which may depend on the amount of cardholders to be serviced), and which may or may not exceed interchange revenue. Therefore, in some cases part of the interchange revenue may still be passed onto the primary issuer after staging account provider fees are deducted, but in other cases the primary issuer may need to pay fees in addition to the revenue collected by the staging account provider from the prepaid interchange revenue. Accordingly, it should be understood that in some scenarios the interchange revenue to the primary issuer for providing staging accounts issued to their cardholders will be significantly reduced, or effectively zero. Thus, from the point of view of primary issuers, the justification for utilizing a staging account may include considerations such as: speed to market; reduction in set-up fees and little or no changes required to the primary issuers host systems; and/or cost effectiveness with regard to undertaking smaller mobile account deployments for cardholders.

It should be understood that the operational cost of the staging account provider service is influenced by the project scope and mobile account (staging account) issuance volumes. In addition, the set-up cost of the mobile account service can be influenced by whether or not the staging account provider already has a suitable "Staging Account Program" available, and/or if core relationships are already in place through their provisioning service partners.

As mentioned earlier, the staging account provider and each primary issuer must have a commercial agreement in place that defines the terms and conditions of the services provided to the primary issuer by the staging account provider. For example, the commercial agreement should include fees to be paid, the method of deployment of the staging accounts (plus how to update and/or remove mobile accounts) including service level agreements of the mobile account, user interface (UI) and mobile wallet to cardholders. In addition, the mobile network operators (MNOs), UICCs and handsets to which the mobile accounts are to be deployed must be specified. In addition, technical support regarding the identification and resolution of any issues that occur when deploying an account to a mobile device, information available to the primary issuer for customer support purposes regarding the progress of deployment of an account, and the current status of a mobile handset and/or UICC (e.g. if the UICC/Handset is lost, stolen, terminated or replaced), and/or whether post issuance management services are available, should be specified. The primary issuer also needs to know the information required for the cardholder enrollment process, and must specify the account funding options (including the frequency and timing, the top-up amount, and the top-up mechanism such as automatic or manual). The agreement must include the reporting functionality (or services) that are required by the primary issuer from the staging account provider, and the web-portals (or API's) that are required by the primary issuer. In addition, the primary issuer specifies the user interface (UI) and wallet design and the branding that should appear on the consumer's mobile device with regard to the staging account. Further, the process for advising the cardholder of their mobile personal identification number (PIN) must be specified, and there must be a sign-off on exception transaction processing to include lost card and/or lost mobile device scenarios, chargebacks and/or returns, transaction declines due to insufficient funds, and fraud liabilities.

The storage device 410 depicted in FIG. 4 may also include a user interface (UI) provider agreements database 422 that includes terms and conditions that define the user interface and digital wallet that is provided to cardholders of each particular primary issuer. For example, fees and commercial terms must be specified, and a license agreement entered into that includes any restrictions imposed, for example, on particular countries and to what handsets the UI and the electronic or digital wallet may be deployed. The agreement must also contain information regarding the method of deployment (and potential updates) of the UI and the digital wallet to mobile devices of cardholders, and must specify the entity that will host a web-portal to support the download of the UI and digital wallet to the cardholders handset. Technical support issues, such as the identification and resolution of any issues that occur with the UI when deployed to consumer mobile devices, and development issues, such as designing a new UI to support new handsets as the need arises for deployment to the new handsets, must also be specified. In addition, the commercial agreement should also cover how ongoing enhancements of the UI and the digital wallet are handled to address changes to mobile/MMPP standards and specifications as they occur.

The storage device 410 may include a Pre-Paid financial institution agreements database 424 that includes terms and conditions that govern the relationship between the staging account provider and each pre-paid financial institution (or BIN sponsor) that provides staging accounts for use with mobile devices. The BIN sponsor is aware of the staging account construct, and the fact that such staging accounts are being deployed to mobile handsets and not to cards. The roles and responsibilities that key stakeholders are undertaking should also be identified. For example, the staging account provider undertakes issuer processing "plus", which means that any additional services necessary to deliver the staging account (which traditionally may have been undertaken by a program manager for a GPR prepaid account) are now handled by the staging account manager. In addition, the primary issuer undertakes marketing of staging accounts, cardholder selection and know-your-customer (KYC) rules, which roles have typically been undertaken by a program manager in a GPR prepaid account.

In addition, the commercial agreement between the BIN sponsor and the staging account provider also specifies the bin range to be utilized, fees and commercial terms, KYC liability, and the duration of the agreement. KYC requirements differ by jurisdiction and thus specific requirements for any target territories should be well understood and specified by the BIN sponsor and/or staging account provider before deploying any mobile accounts for the customers of the primary issuer.

Also shown in FIG. 4 is a provisioning service agreements database 426 that, in some embodiments, includes terms and conditions that govern the relationship between the staging account provider and each provisioning service vendor. As mentioned above, the relationship between the staging account provider and the provisioning service vendors may be complex due to the number of organizations that may be involved in the deployment of accounts. But the staging account provider has a primary relationship with a service provider trusted service manager (SP TSM), who may then manage relationships with other parties as required to achieve deployment. The parties involved in deployment of the mobile account may include, for example, the UICC provider (if the secure element (SE) is located in the UICC), the handset provider (if accounts are being deployed to an embedded SE), the micro SD provider (if the SE is hosted on a micro SD card), the MMPP application provider, the service provider trusted service manager (SP TSM), the secure element trusted service manager (SE TSM), the MNO, the eligibility check service provider (for example, MasterCard International, Incorporated), and/or the retailer (if in store deployment is required).

In addition, the service agreements database 426 may include technical implementation and testing requirements to ensure that mobile accounts can be deployed. Such implementation and testing requirements are required for each staging account program offered to Primary Issuers.

The provisioning service vendor can either be a TSM or a TSP, and thus an agreement with the staging account provider includes fees and commercial terms, account profiles to be deployed, a determination of the entity that is responsible for t the data preparation function, the method of deployment (plus update to mobile account and/or removal of the mobile account) including service level agreements of the account, and how and when the UI and digital wallet is provided to cardholders. In addition, items that may be included are technical support (responsibility for identification and resolution of any issues that occur when deploying an account to a mobile device), further development to support deployment to new handsets and/or new UICC's as required, how and when information is returned to the staging account provider regarding the progress of deployment of an account, and the current status of a mobile handset and/or the UICC (e.g. if the UICC and/or the mobile handset is lost, stolen, terminated or replaced). The agreement should also specify whether or not post issuance management services are available and the overall service the provisioning service provider is expected to provide.

In some embodiments, the storage device 410 may include a MNO agreements database 428 that includes terms and conditions between the staging account provider and the MNO that permits the staging account provider to access the secure element (SE) of the mobile device. Such an agreement between the MNO and the staging account provider includes fees and commercial terms, a license agreement (which may include restrictions imposed regarding operation in some countries and to what handsets an account may be deployed), the information returned to the staging account provider regarding the progress of deployment of an account, and the current status of a mobile handset and/or the UICC (e.g. if the UICC and/or mobile device or handset is lost, stolen, terminated or replaced). Such an agreement may also include the method of deployment (plus how updates and/or removal are handled) including service level agreements of the account, UI and digital wallet to cardholders, spell out how technical support issues are handled (for example, the identification and resolution of any issues that occur when deploying an account to a mobile device), and which entity holds or has access to the keys required to create an MMPP instance with the SE and personalize it with the staging account.

As mentioned earlier, the primary issuer owns and manages the relationship with the cardholder and provides all funds that are loaded onto the cardholder's mobile account (the staging account). The primary issuer also determines if cardholder benefits (for example, loyalty points and the like) earned through use of the card account will be made available on the mobile account, which may require the primary issuer to update their cardholder's benefits based on a report provided by the staging account provider for benefits accrued through the staging account. In some embodiments, the primary issuer provides the staging account provider with visibility into cardholder benefits for each card in their staging account portfolio so that the staging account provider can generate any necessary reports for the primary issuer to reconcile benefits.

As also mentioned herein, the primary issuer is typically responsible for the completion of "Know Your Customer" (KYC) requirements to achieve compliance with regulations and product rules present in the market. Thus, the primary issuer completes this process in accordance with the business services agreement with the staging account provider and provides via an enrollment API, for example, all of the required customer information. Thus, on receipt of a new request for enrollment, the staging account provider validates that all required information is present, and is in the correct format. The enrollment request is then be acknowledged (or an error given if validation fails) and the process of issuing a new mobile account begins. The primary issuer can then monitor progress via a customer services API provided by the staging account provider.

In some embodiments, the cardholder is provided with direct access to their transaction history via a UI on their mobile device. However, some markets have regulatory requirements that mandate that the cardholder be provided with a printed statement of transactions undertaken (which may be implemented via a webpage that the cardholder can print). The primary issuer may use the staging account providers API's to retrieve transaction history information and include that directly in the cardholder's monthly statement. But if a given mobile device is utilized for multiple convenience purchases, then the number of transactions listed may be very large with some cardholders may not appreciate. In addition, the cost of such integration by the primary issuer may far exceed the perceived value, especially if it is to support only a small number of accounts. Thus, in some cases the primary issuer may only list the "top-ups" requested of the staging account provider, which may be described on the cardholder's statement using terms such as "Transfer to mobile account". Such operation minimizes the changes required to the statement system, but may not meet regulatory requirements in some jurisdictions. Thus, the primary issuer may utilize a white label web-portal provided by the staging account provider (if this value added service is available) to provide the cardholder with a separate statement of their transactions performed using their mobile device. Such information made available on the website may include the name of the merchant, the purchase amount, and the date and/or time of the transaction. In cases wherein the primary issuer utilizes the staging account provider's web-portal to provide data to cardholders, the primary issuer and the staging account provider must agree to the branding of the web-portal, and how the cardholder is authenticated when accessing the web-portal. But authentication and hosting of a connection to link the cardholder to the web portal from the primary issuers own website is the responsibility of the primary issuer.

In the event of a problem or question, a cardholder will by default contact the customer service department of the primary issuer. Thus, the primary issuer provides an appropriate level of training for their customer service staff so that such calls can be handled. A specialist team may be set up within the primary issuer's customer service operation to support cardholders that have mobile device accounts. However, due to the complexities of mobile issuance, it is likely that additional technical expertise will also be needed, or processes available to allow escalation of unresolved issues to the staging account provider and/or to other vendors involved in the delivery of the accounts to the cardholder's mobile device. The Primary Issuer's customer support systems may be connected with the staging account provider's API to access account and status information, or the customer support staff is provided with access to the customers staging account information via a web-portal. In addition, the pre-sales and/or customer enrollment teams will also need to be provided with an appropriate level of training.

When funding a staging account, the primary issuer may reduce the "available to spend" balance on the cardholder's primary account. Alternatively, to simplify cardholder messaging, the primary issuer may extend the cardholder's credit limit or overdraft facility (where permitted by law) to hide the initial transfer of funds. The primary issuer also determines which top-up options are available to their cardholders (e.g., automatic, semi-automatic, and/or manual top-ups) and communicate these choices to their cardholders. If choices are available, the selected choice must be provided to the staging account provider during enrollment, and processes put in place via the primary issuer's customer services team (or website) to enable the cardholder to change the selection if necessary.

Figure 5:
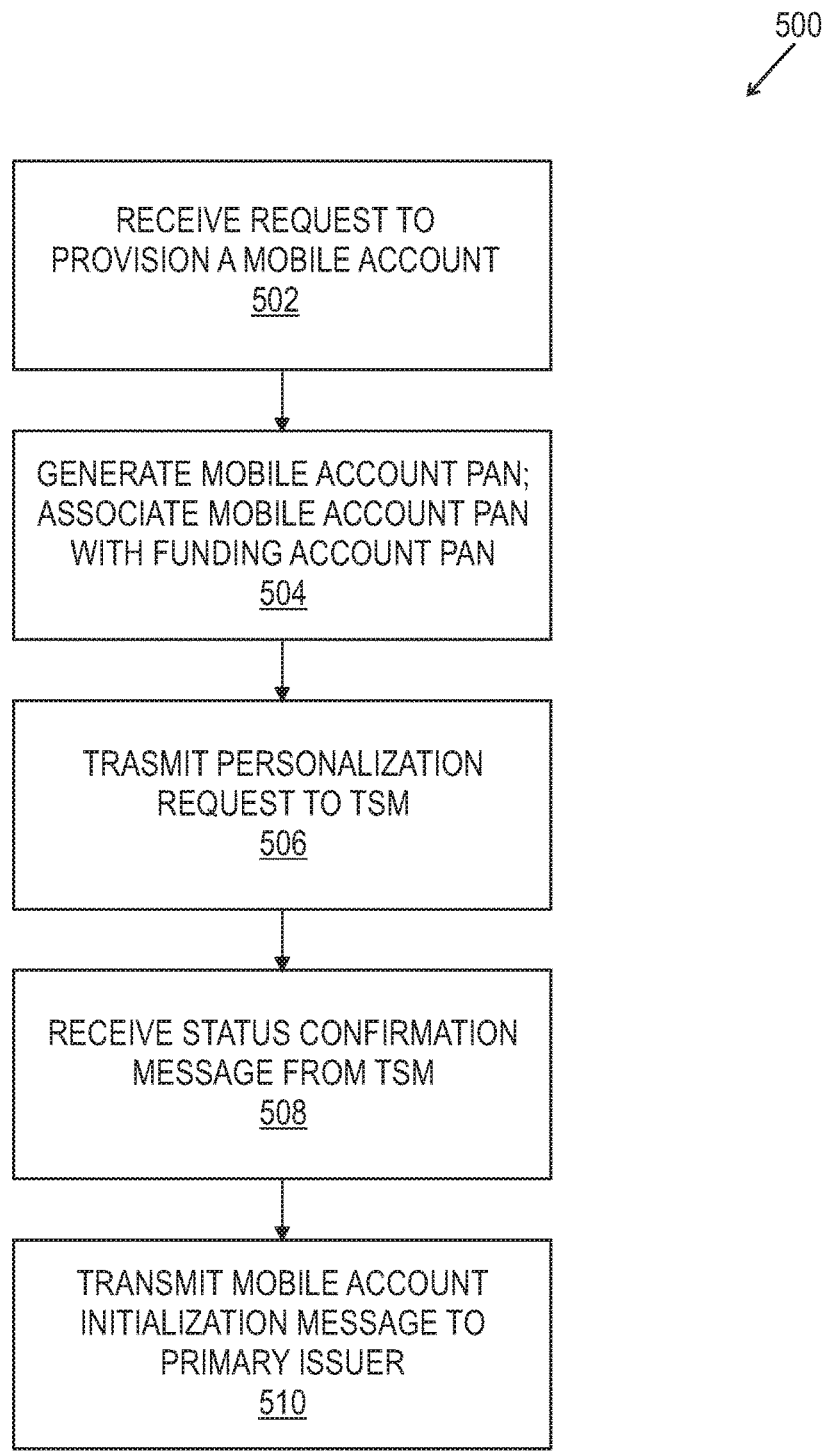
FIG. 5 illustrates a process for mobile staging account provisioning according to an embodiment of the invention.

FIG. 5 illustrates a process 500 for mobile staging account provisioning according to an embodiment. A staging account provider computer receives 502 a request to provision a mobile payment account for a cardholder's mobile device. The request may include a funding account primary account number (PAN) that corresponds to a financial account (i.e., a consumer's credit card account or a debit card account) held by a primary issuer, a mobile device identifier (which may include the mobile telephone number and/or other information, such as a device type identifier), and/or account description data (for example, payment card account branding data). The staging account provider computer then generates 504 a mobile account PAN and associates the mobile account PAN with the funding account PAN. Next, the staging account provider computer transmits 506 a personalization request to a trusted service manager (TSM) computer to personalize a payment application for the cardholder's mobile device. In some embodiments, the personalization request includes the mobile account PAN, the mobile telephone number and the card description data. The staging account provider computer then receives 508 a status confirmation message from the TSM computer. The status confirmation message may include information indicating that the payment application has been personalized and loaded onto the cardholder's mobile device. Lastly, the staging account provider transmits a mobile account initialization message that includes the mobile PAN to the primary issuer. In this manner, a cardholder's mobile device is provisioned and the primary issuer informed that the payment application has been made available to the cardholder for use in making purchase transactions with his or her mobile device according to the cardholder agreement.

Figure 6:
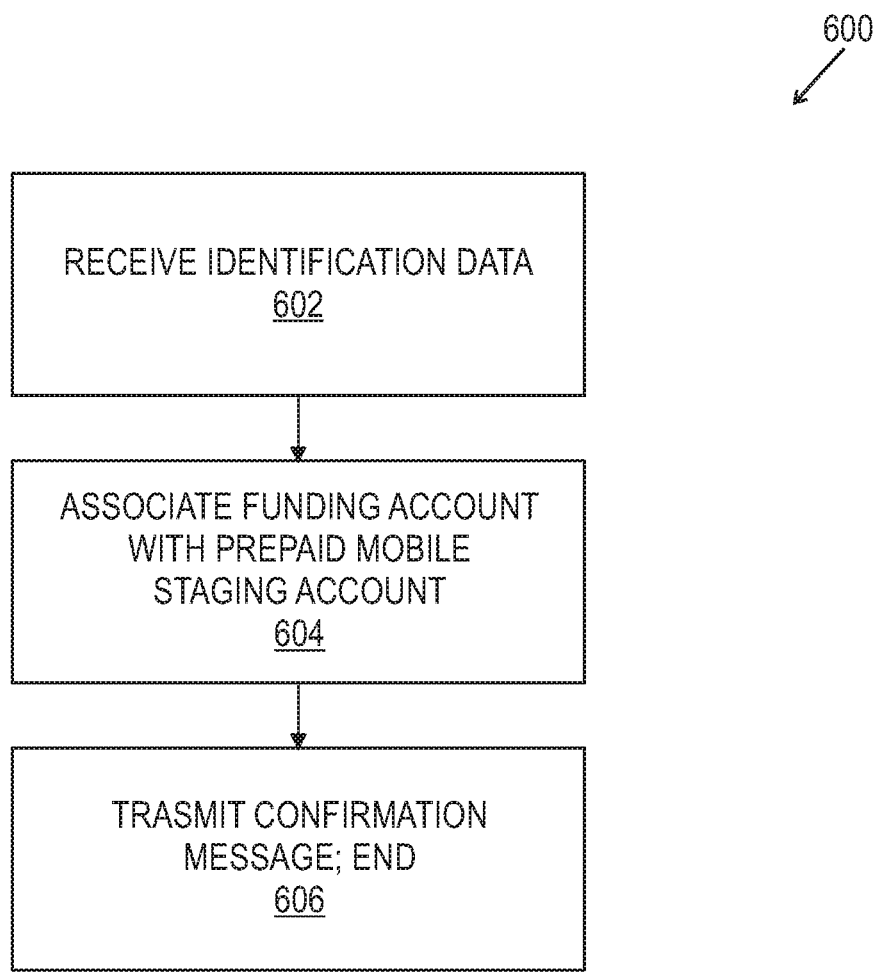
FIG. 6 illustrates a process for providing a mobile staging account according to another embodiment of the invention.

FIG. 6 illustrates a process 600 for providing a consumer with a prepaid mobile staging account according to another embodiment. A staging account provider computer receives 602 identification data, which may include a primary account number (PAN), from a prepaid staging account application program that was loaded on a mobile device. As explained above, in some embodiments, a mobile device provider, which may be associated with a mobile network operator (or MNO, which may operate the mobile platform 104 of FIG. 1) may partner with a staging account provider or with one or more issuer financial institutions (FIs) to offer mobile devices for sale to consumers that are pre-loaded with a prepaid mobile staging account application program. Such devices may be marketed by issuer FI's and/or mobile network operators (MNOs) to consumers. A consumer who purchases such a mobile device (such as a mobile telephone) may initialize or run the pre-loaded prepaid staging account application program to setup his or her mobile prepaid staging account. For example, a mobile staging account application program may be provided as an icon on a touch screen of the mobile device, and the consumer may touch the icon to launch or start a mobile stating staging account enrollment or registration process. For example, the pre-loaded program may open or execute to provide one or more user interface screens to the consumer, which interface screens include one or more blank data fields for the consumer to enter identification information. The identification information may be transmitted to the mobile staging account provider computer, which associates 604 it with a prepaid mobile staging account. The identification information may be used to identify a consumer's financial account, such as a credit card account, a debit card account, or a bank account issued by the consumer's issuer FI. Next, the staging account provider computer transmits 606 a confirmation message to the consumer's mobile device indicating successful setup, and the process ends. In some embodiments, the confirmation message includes the amount of money funding the consumer's prepaid mobile staging account, which may be displayed to the consumer on the display screen of his or her mobile device. After the confirmation message is transmitted, the consumer's prepaid mobile staging account is ready for use to conduct purchase transactions as if it were the funding account.

Embodiments provide a number of advantages. For example, embodiments of the present invention allow issuers to quickly and efficiently launch NFC device payment programs. Pursuant to some embodiments, the prepaid staging account is a general purpose reloadable prepaid account that is configured to look like another issuer's product (with that issuer's card image, messaging and branding) and that is reloaded or "topped up" from a pre-determined credit or debit account operated by the primary issuer (the issuer that issued the original payment account that the staging account appears as). The primary issuer benefits in that they do not need to support NFC programs (such as PayPass™), chip transactions or Mobile PayPass™. The staging account issuer (the issuer that provides the prepaid staging account) uses economies of scale to cover the development effort required to offer the service, and may provide staging account services to a number of different primary issuers.

The above description and/or the accompanying drawings are not meant to imply a fixed order or sequence of steps for any process referred to herein; rather any process may be performed in any order that is practicable, including but not limited to simultaneous performance of steps indicated as sequential.

Although the present invention has been described in connection with specific exemplary embodiments, it should be understood that various changes, substitutions, and alterations apparent to those skilled in the art can be made to the disclosed embodiments without departing from the spirit and scope of the invention as set forth in the appended claims.

What is claimed is:

1. A method for provisioning a prepaid mobile payment staging account to a consumer's mobile device comprising:
   receiving, by a staging account provider computer from a prepaid staging account application program of a consumer's mobile device, a request to provision a prepaid mobile payment staging account, the request including identification information comprising at least a mobile device identifier;
   associating, by the staging account provider computer, the identification information with a prepaid mobile staging account;
   identifying, by the staging account provider computer, a financial account of the consumer held by an issuer financial institution (FI) based on the identification information;
   generating, by the staging account provider computer, a consumer prepaid mobile staging account loaded with funds from the financial account of the consumer; and
   transmitting, by the staging account provider computer, a confirmation message to the consumer's mobile device indicating successful setup.

2. The method of claim 1, further comprising, prior to generating the consumer prepaid mobile staging account, determining, by the staging account provider computer based on the identification information, that a user interface provider agreement exists that includes terms and conditions defining a digital wallet associated with the prepaid mobile staging account provided to the consumer by the issuer FI.

3. The method of claim 2, wherein the user interface provider agreement specifies fees, commercial terms, and restrictions.

4. The method of claim 1, further comprising transmitting, by the staging account provider computer to an issuer FI computer associated with the issuer FI of the consumer's financial account, a confirmation message indicating successful setup of the consumer's mobile staging account.

5. The method of claim 1, further comprising, prior to receiving the request to provision a prepaid mobile payment staging account, loading, by a mobile device provider, the prepaid staging account application program on the consumer's mobile device.

6. The method of claim 1, wherein the confirmation message comprises an indication of the amount of money funding the consumer's prepaid mobile staging account.

7. The method of claim 1, wherein the mobile device provider partners with a mobile network operator (MNO) to offer mobile devices for sale that include the prepaid staging account application program.

8. A non-transitory computer readable medium storing prepaid mobile payment staging account provisioning instructions configured to cause a processor to:
   receive a request to provision a prepaid mobile payment staging account from a prepaid staging account application program of a consumer's mobile device, the request including identification information comprising at least a mobile device identifier;
   associate the identification information with a prepaid mobile staging account;
   identify a financial account of the consumer held by an issuer financial institution (FI) based on the identification information;
   generate a consumer prepaid mobile staging account loaded with funds from the financial account of the consumer; and
   transmit a confirmation message to the consumer's mobile device indicating successful setup.

9. The non-transitory storage medium of claim 8, further comprising, prior to the instructions to generate the consumer prepaid mobile staging account, instructions configured to cause the processor to determine, based on the identification information, that a user interface provider agreement exists that includes terms and conditions defining a digital wallet associated with the prepaid mobile staging account provided to the consumer by the issuer FI.

10. The non-transitory storage medium of claim 8, further comprising instructions configured to cause the processor to transmit a confirmation message indicating successful setup of the consumer's mobile staging account to an issuer FI computer associated with the issuer FI of the consumer's financial account.

11. A system comprising:
   a consumer mobile device;
   a staging account provider computer configured for communication with the consumer mobile device; and an issuer financial institution (FI) computer operably connected to the staging account provider computer;

wherein the staging account provider computer comprises a communications device, a processor operably coupled to the communications device, and a storage device operably connected to the processor, wherein the storage device stores instructions configured to cause the processor to:

receive a request from the consumer's mobile device to provision a prepaid mobile payment staging account, the request including identification information comprising at least a mobile device identifier;

associate the identification information with a prepaid mobile staging account;

identify a financial account of the consumer held by the issuer FI based on the identification information;

generate a consumer prepaid mobile staging account loaded with funds from the financial account of the consumer; and transmit a confirmation message to the consumer mobile device indicating successful setup.

12. The system of claim 11, wherein the storage device stores, prior to the instructions to generate the consumer prepaid mobile staging account, further instructions configured to cause the processor to determine, based on the identification information, that a user interface provider agreement exists that includes terms and conditions defining a digital wallet associated with the prepaid mobile staging account provided to the consumer by the issuer FI.

13. The system of claim 11, wherein the storage device stores further instructions configured to cause the processor to transmit a confirmation message indicating successful setup of the consumer's mobile staging account to the issuer FI computer.

14. The system of claim 11, further comprising a mobile platform operably connected to the consumer mobile device, wherein the mobile platform loads the prepaid staging account application program on the consumer's mobile device before the staging account provider computer receives the request from the consumer's mobile device to provision a prepaid mobile payment staging account.

15. The system of claim 14, wherein the mobile platform comprises a mobile network operator (MNO) that offers mobile devices for sale to consumers that include the prepaid staging account application program.

* * * * *